Sept. 11, 1928.  
W. H. PRATT ET AL  
1,684,241  
TELEMETRIC IMPULSE SUMMATION SYSTEM  
Filed Nov. 16, 1926  
3 Sheets-Sheet 1

Inventors:  
William H. Pratt,  
David R. Price,  
by *Alexander F. Lentz*  
Their Attorney.

Inventors:
William H. Pratt
David R. Price
by Charles E. Tullar
Their Attorney

Patented Sept. 11, 1928.

1,684,241

UNITED STATES PATENT OFFICE.

WILLIAM H. PRATT AND DAVID R. PRICE, OF LYNN, MASSACHUSETTS, ASSIGNORS TO GENERAL ELECTRIC COMPANY, A CORPORATION OF NEW YORK.

TELEMETRIC IMPULSE SUMMATION SYSTEM.

Application filed November 16, 1926. Serial No. 148,911.

Our invention relates to telemetric systems in which the desired motion or measurement is transmitted through the medium of electrical impulses which are produced at the transmitting end and are transformed at the receiving end of the system by suitable apparatus into the form of movement or indication desired. The rate of such impulses, whether produced by a single device or a plurality of devices, varies over a considerable range.

One of the objects of our invention is to provide receiving apparatus which will transform such impulses into a steady motion or indication which is a correct average of the rate of the impulses. Cases may arise where two or more impulses are produced simultaneously by different transmitting devices, and another object of our invention is to provide receiving apparatus of the character described which will properly receive all of such impulses whether produced simultaneously or intermittently.

In carrying our invention into effect we prefer to use a combination of differentials which are actuated in a novel manner in response to the impulses such that a resultant average movement or indication correctly proportional to a summation of all of the impulses is obtained.

The features of our invention which are believed to be novel and patentable will be pointed out in the claims appended hereto. For a better understanding of our invention, reference is made in the following description to the accompanying drawings in which

Figure 1:
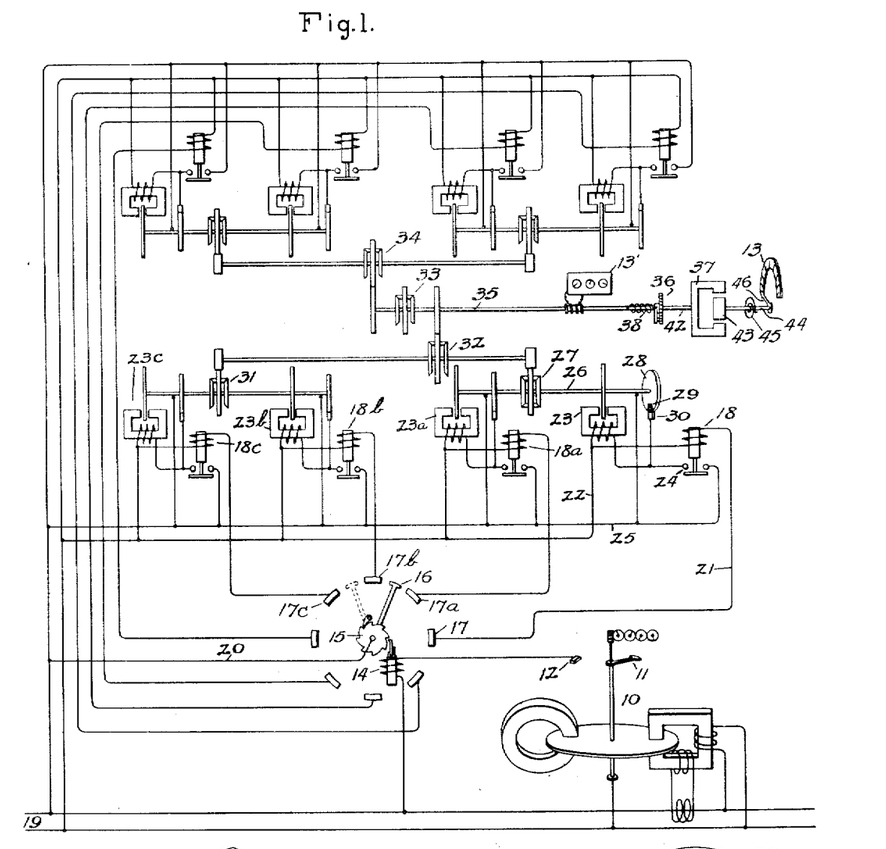
Fig. 1 shows one modification of the invention as applied for producing a steady indication proportional to the average rate of impulses produced by a rotating meter.

Referring to Fig. 1, 10 represents an integrating watthour meter, the rotating shaft of which is provided with a contact arm 11 which cooperates with a stationary contact 12 to produce an electric impulse for each revolution of the shaft and thus send out impulses at a rate proportional to the measurement speed of the meter. The purpose of the invention now to be described is to produce a steady indication on a suitable scale 13 which is proportional to the rate of the meter 10 such that the average instantaneous power metered at 10 will be accurately indicated at 13. It will be understood that curve drawing apparatus, control apparatus, or any other type of deflection apparatus, might also be provided at 13 in place of or in addition to the indicating device shown. When contact is made between 11 and 12, a circuit containing a sensitive ratcheting relay 14 is energized. This relay rotates a ratchet wheel 15 which in this case is provided with eight teeth so that when the relay is energized the wheel makes one-eighth of a revolution. Secured to the wheel is a distributor contact arm 16 which is adapted to make contact with eight equally spaced stationary contacts 17, 17$^a$, 17$^b$, etc. The arrangement is such that the arm 16 never remains stationary on one of these contacts, but instead comes to rest in the intermediate positions. Thus when the relay is energized the arm 16 moves from the position shown to the dotted line position. However, in any such movement the contact over which arm 16 moves, contact 17$^b$ in this case, is momentarily energized. The question might arise as to why this distributor is provided rather than have the contact 11 of the meter cooperate directly with the eight contacts 17, 17$^a$, etc. The primary reason is that the meter might happen to stop with its contact arm resting upon a contact. If this happens with the arrangement shown, no error is produced in the result because the contacts 17, 17$^a$, etc., are normally open and are closed only momentarily as the relay 14 operates.

The eight contacts 17, etc., energize the circuits of corresponding relays which in turn control electric motors. These relays and motors are similar and only one need be described in detail. Thus contact 17 controls the energizing circuit of a relay 18, traced as follows: from one side of the source 19, wire 20 to the contact arm 16, stationary contact 17, wire 21, relay 18, wire 22 and back to the other side of source 19. When this relay closes, it energizes the circuit of a small induction disc motor 23 through the contacts 24 of the relay 18, wires 22 and 25 from the source 19. The motor is thus caused to start and drives a shaft 26 together with one side of a differential 27 and a contact disc 28. The motor is arranged to make exactly one revolution and then shuts itself down. The contact disc 28 is provided with an insulating segment 29 and cooperates with a brush 30. The disc 28 and brush 30 are connected in parallel with the contacts 24 and provide a second energizing connection for the motor 23 except when the insulating segment 29 is adjacent the brush. The operation is as follows: Arm 16 makes momentary contact with 17. This momentarily energizes the relay 18 and contacts 24 are closed. The motor is momentarily energized through 24 and starts so that by the time contacts 24 open again the energizing circuit is completed through the brush 30 and disc 28. The motor makes one revolution and then the segment 29 comes under the brush and the motor stops in the position shown. It will thus be seen that as the arm is moved from one position to another the various motors controlled by these contacts are started, make exactly one revolution and automatically stop. The eight rotary movements thus produced are added up by means of seven differentials. Thus, differential 27 adds the movements of motors 23 and 23ª, differential 31 adds the movements of motors 23ᵇ and 23ᶜ, differential 32 adds the movements of differentials 27 and 31 and differential 33 adds the movements of differentials 32 and a differential 34, the latter of which has a movement corresponding to the sum of the movements of the four motors in the upper part of the figure. As a result of this arrangement a terminal shaft 35 connected to the central member of differential 33 is driven at a speed proportional to the instantaneous sum of the speeds of the various motors. This speed may be anything from zero up to a speed where all of the motors are operating continuously. The degree to which the instantaneous impulses are smoothed out by this arrangement over the entire range of operation is much greater than would appear at first thought. In the first place it is seen that each motor converts a substantially instantaneous impulse into a rotary movement extending over a considerably longer period corresponding to the time it requires for a motor to make a complete revolution. This appreciable period should not be longer than eight times the number of total impulses received during this period when the impulses are coming in at the fastest rate where eight motors are used as in the example given. Of course any additional number of motors may be used, but we have found eight to be sufficient to give very good results for the usual meter application such as is represented. If we consider a condition where the impulse rate is such that one motor starts up just as another stops, it is evident that the final movement of shaft 35 will be exactly uniform. This will happen at least eight different points in the impulse rate range. Thus, if motor 23ª starts just as 23 stops the final speed of shaft 35 is exactly uniform. If motor 23ᵇ starts just as 23 stops, with motor 23ª running and thus overlapping portions of the periods of operation of motors 23 and 23ᵇ, the speed of shaft will be exactly uniform but will be twice as great as before. If motor 23ᶜ starts just as motor 23 stops with motors 23ª and 23ᵇ running, the speed of shaft 35 will be exactly uniform but at three times the speed first assumed above. For intermediate conditions the speed of the terminal shaft 35 will not be exactly uniform but will vary between certain limits from time to time, depending upon the number of motors in operation. However, as the number of motors which are in operation at a given time increases, the percentage variation in speed decreases. The motors, being similar, operate at approximately similar substantially constant speeds although these conditions are not essential since each motor contributes an exact extent of movement to the total for each impulses regardless of its speed.

Figures 3, 4:
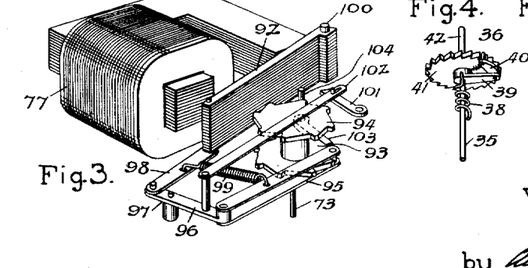
Fig. 3 is a detail view of the ratchet relay shown at 77 in Fig. 2.
Fig. 4 is a detail view of the pawl and ratchet device which is shown between shafts 35 and 42 of Fig. 2.

In order to smooth out the remaining irregularities in the movement over the entire range of speed, we prefer to employ additional means between the shaft 35 and the indicator at 13 for this purpose. This means may comprise a resilient one way driving connection 36 and a magnetic drag torque motor comprising parts 37 and 43. The resilient one way connection may be constructed as shown in Fig. 4. A spring 38 has one end secured to shaft 35 and the other end secured to a dog arm 39 carrying a ratchet pawl 40 which cooperates with a ratchet wheel 41. The dog and ratchet wheel are shown mounted concentric to the shaft 35 and may have bearings thereon. The ratchet wheel 41 is secured to a shaft 42 to which is secured a U-shaped permanent magnet 37 comprising one member of a magnetic drag motor. Between the poles of the magnet 37 is an iron bar armature 43 secured to the indicator shaft 44. The indicator shaft is biased toward a zero position by a spiral spring 45 and carries a pointer 46 cooperating with the stationary scale 13. The shaft 35 drives the ratchet wheel 41 through the resilient dog connection and the spring 38 thus is enabled to smooth out the irregularities in the speed of shaft 35 to a large extent. The permanent magnet 37 constitutes a fly-wheel and upon a sudden decrease in the speed of shaft 35 the dog connection allows the fly-wheel to momentarily overrun the speed of shaft 35. The magnetic drive connection thus produces a substantially smooth torque on the indicator shaft 44 proportional to the average speed of shaft 35 and the resultant indication at 13 is not perceptibly influenced by the small sudden changes in speed of shaft 35 but is only influenced by the average speed. We have found that when the apparatus is calibrated the indicator at 13 gives a reliable and accurate indication of the average power measurement at 10 subject only to a slight time lag. The time lag depends upon the speeds of the driving motors 23, 23ª, etc. For example, if each motor makes its one revolution in ten seconds the indication at 13 would be an average of all the impulses received within the last ten seconds. If the operating period of the motors is one second each, the indication at 13 would be an average of all the impulses received in the last second. In either case the maximum number of impulses received in the operating period should not exceed eight where eight motors are used. In order to obtain the best results in any given installation it will be desirable to adjust the period of operation of the motors so that when the impulses are coming in at the maximum rate, a motor is energized in response to an impulse just at the instant it would shut itself down so that at the maximum impulse rate all of the motors will be operating continuously. Thus by merely adjusting the speeds of the motors the apparatus may be best adapted for any one of a number of installations having different maximum impulse rates. For radically different conditions in this respect it may also be desirable to modify the smoothing out apparatus such as modifying the fly-wheel effect of shaft 42 and the tension of spring 45 and recalibrating the scale 13.

Figure 6:
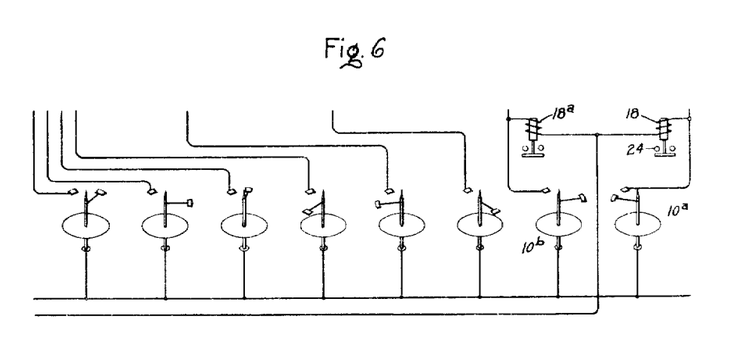
Fig. 6 illustrates the meter connections to obtain a summation indication from a plurality of independent meters.
Figure 7:
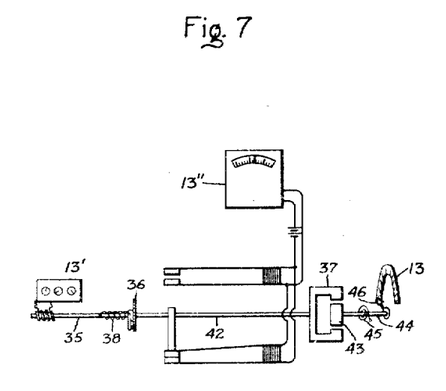
Fig. 7 shows how an ordinary demand meter may be operated from the summation shaft.

The apparatus is especially suitable for transmission over long distances. All of the apparatus with the exception of the contact-making meter 10 will ordinarily be located at the receiving end of the system so that only a single circuit, such as a telephone circuit or a single wire with ground return, is necessary between the two ends of the system. If desired we may integrate the rotations of shaft 35 with a usual meter register such as is indicated at 13′ to provide an integration corresponding to that registered by the meter at 10 at the distant station. We may also operate an ordinary demand meter from shaft 42 as represented at 13″ in Fig. 7. The apparatus is also advantageous for summing up the impulses received from a plurality of meters to obtain a summation indication. For example, in Fig. 6, 10ª, 10ᵇ, etc. represent a plurality of independent meters each operating a contact device. In this case the distributor indicated by reference characters 14 and 17 inclusive of Fig. 1 is omitted and the meter operated contacts directly control the relays 18, 18ª, etc. The apparatus may otherwise be similar to that shown in Fig. 1.

Figure 2:
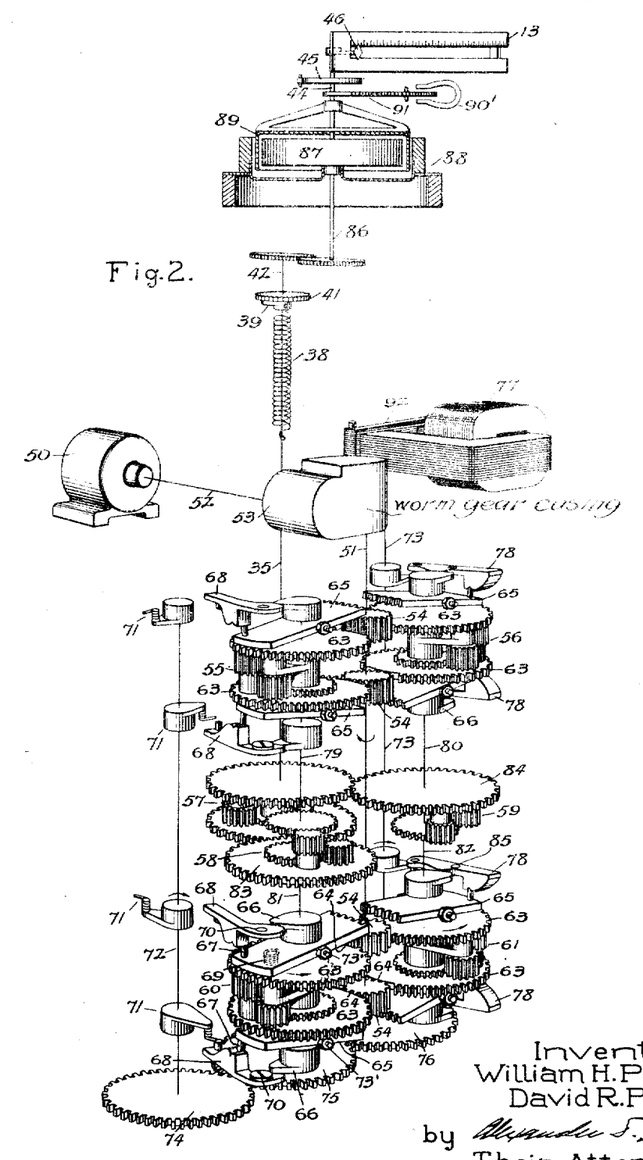
Fig. 2 shows a preferred embodiment of our invention for this purpose. Certain of the connecting shafts of this figure are shown merely as lines in order not to hide other parts of the apparatus.

In Fig. 2 we have shown another modification of our invention which operates on the same general principle as that of Fig. 1 and produces similar results but which is more practical and less expensive to build. The essential difference is that in Fig. 2 only one driving motor is used for all of the differentials and the impulses are utilized to consecutively connect the various differentials in driving relation with this motor for a predetermined motion period. In Fig. 2 certain of the drive shafts associated with the differentials are shown merely as lines in order not to hide other parts of the apparatus. The entire differential mechanism will preferably be nestled together and housed in an oil-tight chamber (not shown) and will preferably operate in oil to eliminate noise and reduce friction and wear. In this figure, 50 represents the driving motor for all of the differentials. It is connected to a main drive shaft 51 through its shaft 52 and worm gearing contained in a casing 53. Shaft 51 is provided with four gear wheels 54, each one of which is adapted to drive one side of two differentials located on opposite diameters of the gear wheels 54. Thus, the upper gear wheel 54 is adapted to drive the upper sides of differentials 55 and 56 and the gear wheel 54 next to the top is adapted to drive the lower sides of these same differentials. All of the differentials of this mechanism are of the well known spur gear type and are numbered from 55 to 61 respectively. Differential 59 adds the movements of differentials 56 and 61, differential 58 adds the movements of differentials 55 and 60, and differential 57 adds the movements of differentials 58 and 59. Differential 57 drives the terminal shaft 35 extending upward to the indicating apparatus. Each side of the four differentials 55, 56, 60 and 61 is provided with a driving gear 63 which is adapted to be placed in driving connection with the adjacent drive gear 54 in response to received impulses for one revolution of the wheel 63 after which it is disengaged. Each of the eight wheels 63 and the mechanism associated therewith are substantially similar and only one need be described. It is best shown adjacent the differential 60. The wheel 63 which drives one side of the differential has a section at 64 where there are no teeth. In the stationary position of the wheel this section is opposite its driving gear 54 and consequently is not in driving connection. The segmental gear wheel 63 is secured to a hollow shaft or collar which carries a gear sector 65 pivoted at right angles to the axis of rotation and a cam 66. The teeth in the gear sector 65 are opposite the open section 64 of the gear wheel 63 and correspond to those missing from the wheel 63. In the position shown the teeth in sector 65 are raised above the drive gear 54 but are adapted to be moved down so as to complete the driving connection upon the reception of the proper impulse. The opposite end of the gear sector 65 carries a pin 67, which pin cooperates with a cam 68 to normally hold the sector 65 in the disengaged position shown against the tension of a spring indicated in dotted lines at 69. The cam 68 is pivoted at 70 to a stationary part of the frame-work (not shown). This cam is adapted to be rotated in a counterclockwise direction, as viewed here, by means of a spring finger 71 secured to a shaft 72, which shaft is rotated in eight equal steps in a clockwise direction in response to received impulses. During one of these steps finger 71 engages with and moves past the cam 68. When the cam 68 is thus rotated, it disengages the pin 67 and allows the gear sector 65 to rotate about its central pivot point indicated at 73' so that its teeth engage with the drive gear wheel 54. Gear sector 65, gear 63 and cam 66 are then rotated as a unit in a counterclockwise direction. As soon as this unit starts to rotate the toothed portion of gear 63 engages with the drive wheel 54, cam 66 rotates against the inwardly projecting end of cam 68 and moves it back into its initial position. By this time, however, the pin 67 has rotated from beneath the raised portion of cam 68 with which it is engaged in the idle position so that the wheel 63 makes one complete revolution near the end of which the pin 67 again rides up the raised portion of cam 68, thereby disengaging gear sector 65 from drive gear 54 as the open section of gear 63 arrives opposite drive gear 54 and the device comes to a stop with the parts in the position shown.

There are eight spring fingers 71, four on shaft 72 and four on shaft 73. As shown here these two shafts are geared together by gear wheels 74, 75 and 76 and these shafts are driven by a ratchet relay 77, the details of which are shown in Fig. 3. The four spring fingers on shaft 72 cooperate with the four cams 68 of the differentials 55 and 60. The four spring fingers on shaft 73 similarly cooperate with corresponding cams 78 of the two differentials 56 and 61. These spring fingers are so positioned on their shafts that only one finger engages its cam for each impulse. The two shafts 72 and 73 make one revolution for each eight impulses received by the relay 77. Thus for each impulse step corresponding to a 45 degree rotation of the shafts 72 and 73, one of the spring fingers comes into action. The four vertical shafts 79, 80, 81 and 82, which convey the movements of differentials 55, 56, 60 and 61 respectively to the two sides of differentials 58 and 59, provide bearings upon which the gear wheel units 63 rotate. Likewise shafts 81 and 80 provide bearings for gears 83 and 84, which convey the movements of differentials 58 and 59 to the differential 57. As shown here, the drive shaft 51 rotates in a clockwise direction. All of the differentials except 55 have their parts driven in a counterclockwise direction. Shafts 72 and 73 rotate in a clockwise direction. Due to the arrangement of the parts the four cams 68 on the left side of the figure are arranged slightly differently from the four cams 78 on the right side of the figure. Cams 78 are pivoted at 85. The fingers on shaft 73 rotate these cams in a counterclockwise direction to release the differential driving mechanisms and cams 66 move them back again where they will engage and lock the driving mechanism after it has made one revolution. The result produced by this mechanism in summing up and smoothing out the impulses is the same as that produced by the apparatus shown in Fig. 1.

Figure 5:
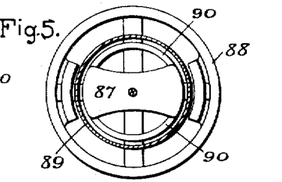
Fig. 5 is an end view of the magnetic drag device between shafts 86 and 44, Fig. 2, as it would appear from the under side.

The apparatus between the terminal shaft 35 and the indicator scale 13 is generally similar to that shown in Figs. 1 and 4 and like parts are similarly numbered. The magnetic drag motor is somewhat different from that shown in Fig. 1 and includes means to make the operation of this connection independent of changes in temperature. A sectional plan view of this connection is shown in Fig. 5. The drive shaft 86, which is geared to shaft 42, carries an inner permanent bar magnet 87 and a cooperating outer magnetic structure 88, the two parts being separated by a concentric air gap into which a cylindrical member 89 of conducting material extends. The member 89 is secured to the indicator shaft 44. When shaft 86 is rotated eddy currents are set up in the member 89 due to the strong flux therethrough and a torque proportional to the speed is created. This torque drags the cylindrical member 89 around against the action of the spring 45 and produces an indicating deflection of the pointer 46 corresponding to the torque. The torque at a given speed would ordinarily vary slightly due to temperature changes. This is because the resistance of the eddy current cylinder increases with temperature. Also, there is known to be a slight falling off in the strength of permanent magnets as temperature increases. To compensate for these conditions we prefer to shunt the poles of the magnet 87 by bars 90 which have a negative temperature coefficient of permeability. Certain alloys or nickel and copper have this property. The result of this arrangement is that at low temperatures a small portion of the flux of the magnet 87 is shunted and does not pass through the cylinder 89. As the temperature increases, less and less flux is shunted so that the useful operating flux is increased slightly. The eddy current drag is thus compensated for temperature changes. The movable indicating unit is preferably damped by means of an induction disc damping magnet system shown at 90' which is geared to the indicator shaft by a gear sector 91. The parts 87 and 88, which are secured to shaft 86, constitute a fly-wheel. The mechanism between shaft 35 and the indicator is thus enabled to smooth out all irregularities in the motion of shaft 35 and convert the irregular rotary motion into a steady deflection proportional to the average rotary motion.

The relay 77 which actuates shaft 73 is especially designed to perform its function accurately and the details are shown in Fig. 3. It comprises a sensitive magnetic notching relay, the armature 92 of which is connected to the ratcheting mechanism in a special way. On the upper end of shaft 73 is a pair of ratchet wheels 93 and 94, each having eight teeth reversely arranged. 93 is the drive wheel and 94 is a stop wheel. The wheel 93 is advanced by a link-shaped pawl 95 having one end engaging the teeth in wheel 93 and the other end pivoted to a lever 96 which is pivoted at 97 and pivotally secured to the armature 92 by another link 98. The three connected members 95, 96 and 98 lie in the shape of a U with the lever 96 connecting the two side pieces 95 and 98. A spring 99 is connected between these two side pieces and serves to keep the ratchet end of link 95 engaged with the ratchet wheel and to retract the armature and pawl when the relay 77 is deenergized. The armature is pivoted at 100 and when in the detracted position shown lies in substantially a straight line with link 98. When the relay is energized the initial movement of the armature occurs when the spring 99 is under the least tension and when little work of moving the ratcheting mechanism is performed. As a consequence, the relay is very sensitive but is enabled to perform its work because the particular arrangement of levers shown cause the major portion of the work to be done in the final stage of the armature movement when the magnetic pull is strongest. A stop pawl 101, connected to lever 96 by a link 102, is swung into engagement with the stop wheel 94 as the armature is attracted, thereby preventing movement of shaft 73 more than 45 degrees for each actuation. A pawl 103 may be provided to prevent any backward rotation of wheel 93. A stop pin 104 is preferably provided to limit the movement of the armature away from its attracted position. This type of relay is sensitive to weak impulses such as might be expected to result from a meter actuated contactor several miles away but nevertheless performs its function successfully and accurately in response to such impulses. To adopt the apparatus shown in Fig. 2 for a duplex metering scheme, it is only necessary to omit gear wheel 75 and provide another relay similar to 77 for actuating shaft 72. In fact, we could if desired actuate each of the eight fingers 71 by separate relays in response to impulses separately transmitted from as many meters to obtain a resultant summation indication.

In accordance with the provisions of the patent statutes, we have described the principle of operation of our invention, together with the apparatus which we now consider to represent the best embodiment thereof; but we desire to have it understood that the apparatus shown and described is only illustrative, and that the invention may be carried out by other means.

What we claim as new and desire to secure by Letters Patent of the United States, is,—

1. Apparatus for producing an indication in response to electric impulses and proportional to the average impulse rate comprising a shaft, impulse responsive differential driving means for said shaft for producing continuous rotary motion proportional to the average impulse rate, a magnetic drag torque motor, comprising relatively rotatable parts, a resilient driving connection between said shaft and one part of said motor and resilient means opposing continuous rotation of the other part of said motor.

2. Apparatus for producing an indication in response to electric impulses and proportional to the average impulse rate comprising an impulse responsive relay, differential means for producing rotary motion proportional to the sum of a plurality of separate rotary motions, driving means for said differential mechanism, means responsive to the operation of said relay for causing said driving means to consecutively impart a plurality of predetermined individual rotary motions, each of appreciable duration as compared to the duration of an impulse, to said differential mechanism at as many different driving points in response to consecutive impulses, and means driven by said differential mechanism for converting irregular rotary motion into a steady deflection proportional to the average rotary motion rate.

3. Apparatus for producing an indication in response to electric impulses and proportional to the average impulse rate comprising a shaft, impulse responsive differential means for driving said shaft at a speed proportional to the average impulse rate, a magnetic drag torque motor having one member comprising a fly-wheel, a resilient driving connection between said shaft and fly-wheel member including a dog which permits the fly-wheel member to overrun the shaft, a deflection shaft to which the other member of said magnetic drag torque motor is secured, and resilient means for resisting the torque conveyed to said deflection shaft by said motor.

4. Apparatus for producing rotary motion proportional to the average rate of occurrence of irregularity occurring electric impulses comprising an electromagnet relay responsive to such impulses, a differential mechanism arranged to add individual rotary movements to produce a resultant rotary movement, driving means for producing a plurality of such individual rotary movements, and means actuated by said relay for causing said driving means to impart consecutive predetermined rotary movements of appreciable duration to said differential mechanism in response to consecutive impulses.

5. In an impulse transmitting system, apparatus for producing rotary motion in response to electric current impulses comprising differential mechanism arranged to add individual rotary movements to produce a resultant rotary movement, driving means for said differential mechanism, and means responsive to consecutive impulses for causing the driving means to impart such individual rotary movement to said differential mechanism for each such impulse, said movements being equal and extending over time periods appreciably longer than the impulse period.

6. Apparatus for producing rotary motion in response to electric impulses and proportional to the average impulse rate comprising a plurality of rotatably mounted shafts, means for producing a resultant rotary movement proportional to the sum of the speeds of all of said shafts at any instant, including driving means for said shafts, impulse responsive means for consecutively causing said shafts to be driven by said driving means in response to consecutive impulses, and means responsive to predetermined rotary movements of said shafts for individually stopping said shafts.

7. Apparatus for producing rotary motion in response to electric impulses and proportional to the average impulse rate comprising a plurality of rotatably mounted shafts, means driven by said shafts for producing a resultant rotary motion proportional to the sum of the speeds of all of said shafts at any instant, driving means for said shafts, starting means for each shaft, impulse responsive means for consecutively actuating said starting means in response to consecutive impulses, and means responsive to predetermined rotary movements of said shafts for individually stopping them.

8. Apparatus for producing rotary motion in response to electric impulses and proportional to the average impulse rate comprising a plurality of rotatably mounted devices, means driven by said devices for producing a resultant rotary motion proportional to the sum of the speeds of all of said devices at any instant, common driving means for all of said devices, means for individually connecting said devices in driving relation with said driving means, impulse responsive means for consecutively establishing said driving connections in response to consecutive impulses, and means responsive to predetermined rotary movements of said devices for individually interrupting said driving connections.

9. Apparatus for producing rotary motion in response to electric impulses and proportional to the average impulse rate comprising a plurality of rotary mounted devices, differential means driven by said devices for producing a resultant rotary motion proportional to the sum of the speeds of all the devices at any instant, driving means for said devices, impulse responsive means for consecutively causing said devices to be driven by said driving means in response to consecutive impulses, and means responsive to one rotation of each device for stopping its rotation.

10. Apparatus for producing a 360 degree rotary movement in response to an electric impulse comprising a continuously driven gear wheel, a second gear wheel adapted to be driven thereby, said second gear wheel having a segment with the teeth cut away so as to interrupt the driving connection between said gears at this point, a toothed segment pivotally secured to said second mentioned gear and movable into engagement with the first-mentioned gear to complete the above-mentioned interrupted driving connection, an electric relay responsive to electric impulses, means actuated thereby for moving said gear segment to establish said driving connection, and means responsive to the resulting rotation of said second-mentioned gear for moving said gear sector to its inactive position and stopping said second-mentioned gear after it has made a complete revolution.

11. Telemetric apparatus for converting irregular rotary motion into a steady deflection proportional to the rotary motion rate comprising a shaft driven at a variable speed, a magnetic drag torque motor having a permanent magnet fly-wheel member and an eddy current conducting member, a one-way resilient driving connection between said shaft and the fly-wheel member of said motor, a deflection shaft secured to the eddy current member of said motor, a spiral spring secured between said deflection shaft and a stationary support, and means for damping movements of said deflection shaft.

12. Telemetric apparatus for converting irregular rotary motion into a steady deflection proportional to the rotary motion rate comprising a shaft driven at a variable speed, a magnetic drag torque motor, a resilient one-way driving connection between the driven member of said motor and said variable speed shaft, a deflection shaft secured to the driven member of said motor, resilient means for resisting rotation of said deflection shaft, and means for maintaining the torque of said motor independent of temperature changes.

13. Apparatus for producing a relatively uniform rotary motion approximately proportional to the average rate of occurrence of irregularly occurring electric impulses comprising a differential mechanism arranged to add individual rotary movements to produce a resultant rotary movement, electric impulse responsive means for imparting predetermined individual rotary movements to said differential mechanism, a rotatably mounted shaft driven by said differential mechanism in response to the resultant rotary movement thereof, said drive being through a resilient driving connection, and means for damping the rotary movements of said shaft.

14. Apparatus for producing rotary motion substantially proportional to the rate of occurrence of irregularly occurring electric impulses comprising a differential mechanism having driving parts arranged to be individually rotated a predetermined amount in response to individual electric impulses and parts driven by said first mentioned parts for producing a resultant rotary movement corresponding to the sum of individual rotary movements of said driving parts, and a magnetically damped rotatably mounted shaft driven by said differential mechanism through a resilient driving connection.

In witness whereof, we have hereunto set our hands this 13th day of November, 1926.

WILLIAM H. PRATT.
DAVID R. PRICE.

CERTIFICATE OF CORRECTION.

Patent No. 1,684,241.  Granted September 11, 1928, to

WILLIAM H. PRATT ET AL.

It is hereby certified that error appears in the printed specification of the above numbered patent requiring correction as follows: Page 2, line 104, for the word "impulses" read "impulse"; page 6, line 8, claim 4, for the word "irregularity" read "irregularly"; and that the said Letters Patent should be read with these corrections therein that the same may conform to the record of the case in the Patent Office.

Signed and sealed this 6th day of November, A. D. 1928.

(Seal)

M. J. Moore,
Acting Commissioner of Patents.

a magnetic drag torque motor, a resilient one-way driving connection between the driven member of said motor and said variable speed shaft, a deflection shaft secured to the driven member of said motor, resilient means for resisting rotation of said deflection shaft, and means for maintaining the torque of said motor independent of temperature changes.

13. Apparatus for producing a relatively uniform rotary motion approximately proportional to the average rate of occurrence of irregularly occurring electric impulses comprising a differential mechanism arranged to add individual rotary movements to produce a resultant rotary movement, electric impulse responsive means for imparting predetermined individual rotary movements to said differential mechanism, a rotatably mounted shaft driven by said differential mechanism in response to the resultant rotary movement thereof, said drive being through a resilient driving connection, and means for damping the rotary movements of said shaft.

14. Apparatus for producing rotary motion substantially proportional to the rate of occurrence of irregularly occurring electric impulses comprising a differential mechanism having driving parts arranged to be individually rotated a predetermined amount in response to individual electric impulses and parts driven by said first mentioned parts for producing a resultant rotary movement corresponding to the sum of individual rotary movements of said driving parts, and a magnetically damped rotatably mounted shaft driven by said differential mechanism through a resilient driving connection.

In witness whereof, we have hereunto set our hands this 13th day of November, 1926.

WILLIAM H. PRATT.
DAVID R. PRICE.

CERTIFICATE OF CORRECTION.

Patent No. 1,684,241.    Granted September 11, 1928, to

WILLIAM H. PRATT ET AL.

It is hereby certified that error appears in the printed specification of the above numbered patent requiring correction as follows: Page 2, line 104, for the word "impulses" read "impulse"; page 6, line 8, claim 4, for the word "irregularity" read "irregularly"; and that the said Letters Patent should be read with these corrections therein that the same may conform to the record of the case in the Patent Office.

Signed and sealed this 6th day of November, A. D. 1928.

(Seal)

M. J. Moore,
Acting Commissioner of Patents.